(12) United States Patent
Park et al.

(10) Patent No.: US 10,846,399 B2
(45) Date of Patent: Nov. 24, 2020

(54) METHOD AND DEVICE FOR PROTECTING INFORMATION FROM SIDE CHANNEL ATTACK

(71) Applicant: SAMSUNG ELECTRONICS CO., LTD., Suwon-si (KR)

(72) Inventors: Jin-bum Park, Anyang-si (KR); Dong-uk Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 167 days.

(21) Appl. No.: 16/035,196

(22) Filed: Jul. 13, 2018

(65) Prior Publication Data

US 2019/0121966 A1    Apr. 25, 2019

(30) Foreign Application Priority Data

Oct. 24, 2017    (KR) .......................... 10-2017-0138460

(51) Int. Cl.
*G06F 21/60* (2013.01)
*G06F 21/54* (2013.01)
*G06F 21/56* (2013.01)

(52) U.S. Cl.
CPC ............ *G06F 21/54* (2013.01); *G06F 21/566* (2013.01); *G06F 2221/034* (2013.01)

(58) Field of Classification Search
None
See application file for complete search history.

(56) References Cited

U.S. PATENT DOCUMENTS

| 7,424,706 | B2 | 9/2008 | Ivanov et al. | |
|---|---|---|---|---|
| 9,436,603 | B1 * | 9/2016 | Pohlack | G06F 21/556 |
| 9,438,624 | B2 | 9/2016 | Fine | |
| 2007/0150530 | A1 | 6/2007 | Mevergnies et al. | |
| 2014/0223568 | A1 | 8/2014 | Boehl | |
| 2014/0283040 | A1 * | 9/2014 | Wilkerson | G06F 21/52 726/22 |
| 2016/0110554 | A1 * | 4/2016 | Kang | G06F 21/83 726/27 |
| 2017/0185532 | A1 * | 6/2017 | Durham | G06F 11/1004 |

* cited by examiner

*Primary Examiner* — Brandon S Hoffman
(74) *Attorney, Agent, or Firm* — Sughrue Mion, PLLC

(57) ABSTRACT

Provided is a method, performed by a device, of protecting information from a side channel attack, the method including: loading a library shared by at least one application installed in the device to a memory of a first layer; inputting a value to a function of the library; based on the value being input, detecting a region of the memory accessed by the device from among regions of the memory of the first layer, to which the library is loaded; generating a protection code which accesses regions of the memory other than the detected region from among the regions of the memory of the first layer, to which the library is loaded; and adding the protection code to the function of the library.

15 Claims, 6 Drawing Sheets

METHOD AND DEVICE FOR PROTECTING INFORMATION FROM SIDE CHANNEL ATTACK

CROSS-REFERENCE TO RELATED APPLICATION

This application is based on and claims priority under 35 U.S.C. § 119 to Korean Patent Application No. 10-2017-0138460, filed on Oct. 24, 2017, in the Korean Intellectual Property Office, the disclosure of which is incorporated by reference herein in its entirety.

BACKGROUND

1. Field

The disclosure relates to methods and devices for protecting information from a side channel attack.

2. Description of Related Art

A side channel attack is a method of discovering secret information, such as an encryption key or an input value, by collecting and analyzing measurable physical quantities, such as power consumption, electromagnetic waves, execution times, sound, and operational times, which are generated while a device processes information. Even when a target algorithm is protected by a high level of cryptographic theory, physical information generated while the target algorithm is operated is externally exposed and thus may be measured by an attacker. Accordingly, even when an algorithm is highly encrypted, the algorithm is not safe from a side channel attack using a physical quantity generated during an operation process.

Thus, in order for a device to maintain a high level of security, the device needs a method for protecting information from a side channel attack.

SUMMARY

Provided are methods and devices for protecting information from a side channel attack.

Provided are methods and devices for protecting a value input to a function of a library from a side channel attack.

Additional aspects will be set forth in part in the description which follows and, in part, will be apparent from the description, or may be learned by practice of the presented embodiments.

In accordance with an aspect of the disclosure, a method, performed by a device, of protecting information from a side channel attack, includes: loading a library shared by at least one application installed in the device to a memory of a first layer; inputting a value to a function of the library; based on the value being input, detecting a region of the memory accessed by the device from among regions of the memory of the first layer, to which the library is loaded; generating a protection code which accesses regions of the memory other than the detected region from among the regions of the memory of the first layer, to which the library is loaded; and adding the protection code to the function of the library.

In accordance with another aspect of the disclosure, a device includes: a memory of a first layer configured to load a library shared by at least one application installed in the device; and a processor configured to input a value to a function of the library, based on the value being input, access at least one region of the memory from among regions of the memory of the first layer, to which the library is loaded, generate a protection code which accesses regions of the memory other than the accessed region from among the regions of the memory of the first layer, to which the library is loaded, and add the protection code to the function of the library.

In accordance with another aspect of the disclosure, a non-transitory computer-readable recording medium has recorded thereon a program which, when executed by a computer, performs the method.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
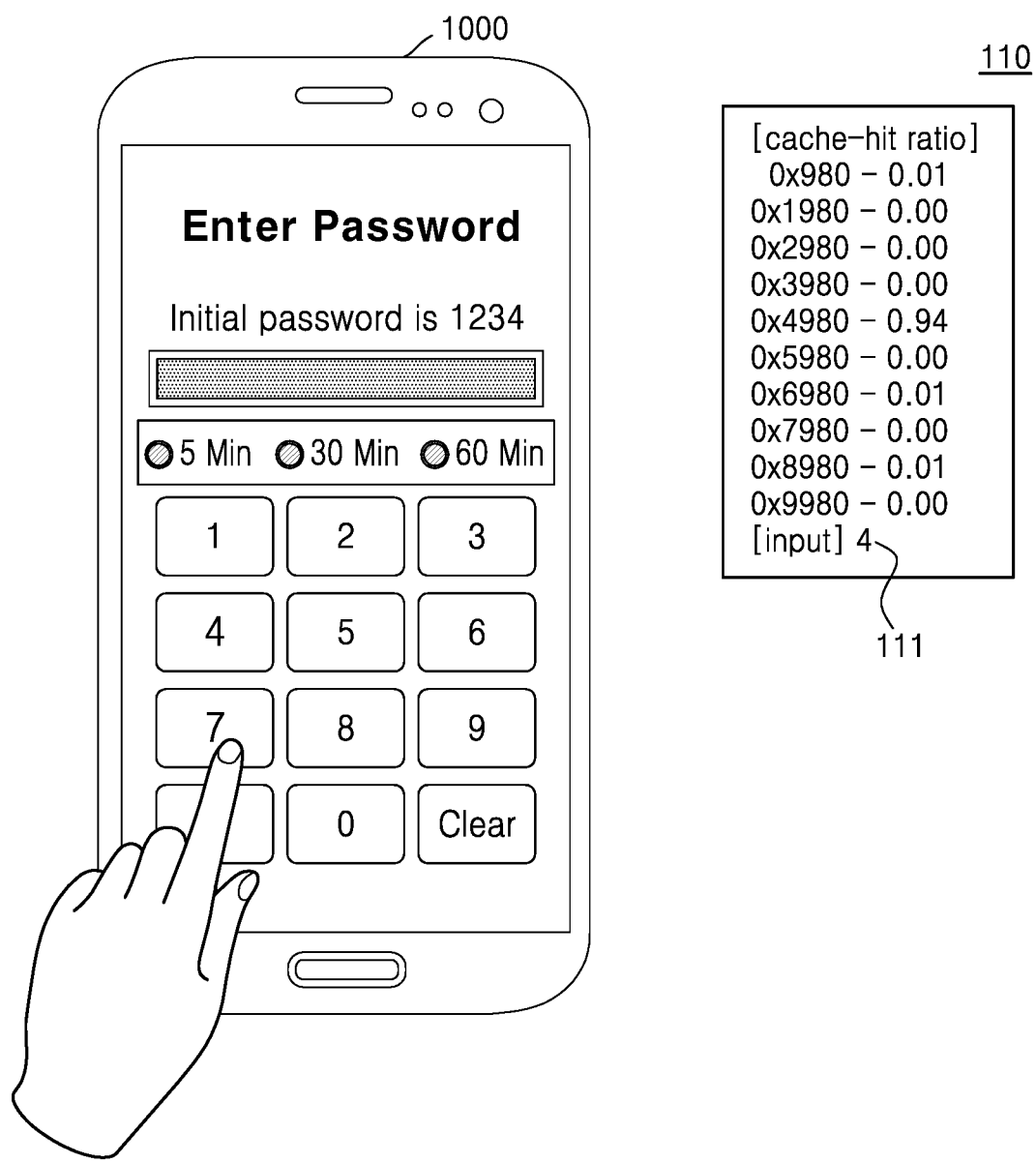
FIG. 1 is a diagram illustrating an example of a region of a memory accessed by a library according to a user input, according to an embodiment.

Hereinafter, embodiments will be described more fully with reference to the accompanying drawings to be easily executed by one of ordinary skill in the art. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. In drawings, elements irrelevant to description are not shown for clear description, and like elements denote like reference numerals throughout the specification.

In the specification, when a region is "connected" to another region, the regions may not only be "directly connected", but may also be "electrically connected" via another device therebetween. Also, when a region "includes" an element, the region may further include another element instead of excluding the other element, otherwise differently stated.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, embodiments will be described in detail with reference to accompanying drawings.

FIG. 1 is a diagram illustrating an example of a region of a memory accessed by a library according to a user input, according to an embodiment.

Referring to FIG. 1, a device 1000 may receive an input value from a user through an application. The input value may include, for example, a password or data related to personal information that requires a high security level. Also, the application may be, for example, a financial application that requires high security.

According to an embodiment, the application may receive the input value from the user and invoke a function of a library for processing the input value. The library may be shared by at least one application installed in the device 1000. The input value received from the user may be input to the function invoked by the application.

According to an embodiment, when the application invokes the function for processing the input value, the device 1000 may access a region of a memory, to which the library including the invoked function is loaded, from among libraries loaded to the memory. The library may be loaded to the memory from a hard disk region according to system booting or event occurrence. Alternatively, the library may be loaded to the memory from a hard disk region by invocation of the application.

When the library is loaded to the memory, data of the library may be stored in regions of the memory, to which memory addresses are respectively assigned. The device 1000 may obtain the data of the library by accessing the data of the library stored in the memory by using the memory address, and perform a operation by using the obtained data. For example, the device 1000 may obtain the data of the library to process the input value by using the function invoked by the application. When the library is shared by at least one application, the memory address where the data of the library is stored may be shared such that the at least one application may use the library.

According to an embodiment, when the device 1000 accesses a memory address, data stored in the memory may be loaded to a memory of an upper layer than the current memory for a quick operation process of the device 1000.

The memory storing the data may be a main memory. Also, the memory of the upper layer may include at least one of a cache memory and a register. When the data is loaded to the memory of the upper layer, a time taken for the device 1000 to access data of a memory address may be reduced. When a time taken to access data is reduced, an operation process speed is increased, and thus data that is highly likely to be reused may be loaded to the memory of the upper layer. Accordingly, when the device 1000 accesses a region of the memory, data stored in the region may be loaded to the memory of the upper layer such that the data is quickly processed.

Even when data is loaded to the memory of the upper layer, a memory address of the data is not changed unless the data is deleted from the main memory. Accordingly, the device 100 may access the data loaded to the memory of the upper layer through the existing memory address even when the data is loaded to the memory of the upper layer.

According to an embodiment, as the input value is input to the function of the library loaded to the memory, the device 1000 may access the region of the memory where the data of the library is stored, so as to process the input value. Also, as the device 1000 accesses the region of the memory, the data stored in the region of the memory may be loaded to the memory of the upper layer.

A probability of the data at each memory address being loaded to the memory of the upper layer as the input value is input to the function of the library loaded to the memory is referred to as a cache-hit rate. According to an embodiment, a side channel attack for extorting information may be performed based on the cache-hit rate.

When a function into which an input value is input is a function of a shared library, a memory address where the shared library is stored may be shared with another application so that the other application may use the shared library. Also, the other application may access the memory address where the shared library is stored such that the other application may use the shared library. Accordingly, when the memory address of the shared library is shared and accessed by an attacker, the attacker may infer the input value through the above method. For example, the shared library may be Libinput.so.

A reference numeral 110 of FIG. 1 shows an example of a cache-hit rate indicating a probability of data at each memory address being loaded to a cache memory, i.e., a memory of an upper layer, when 4 is input as an input value 111 to a function of a library. 0x980 through 0x9980, i.e., memory addresses, indicated by the reference numeral 110 may include some or all of addresses of regions of a memory where a library is stored, into which an input value is input.

According to an embodiment, the cache-hit rate may denote a probability of data at each memory address being loaded to a cache memory, i.e., a memory of an upper layer, when an input value is input to a function of a library. The cache-hit rates with respect to the memory addresses may have different values based on the function and the input value input to the function.

Whether data at a memory address is to be loaded to a memory of an upper layer according to an input value may vary even when the same input value is input to the same function. Accordingly, the cache-hit rate may be determined based on a probability value representing a probability of whether the data at the memory address is loaded to a cache memory by inputting the same input value to the same function several times.

The cache-hit rate may have a value between 0 to 1, and the probability of the data at the memory address being loaded to the cache memory by the input value is high when the cache-hit rate is close to 1.

Whether the data at the memory address is loaded to the cache memory may be determined based on a time taken for the device 1000 to access the memory address whenever a value is input to the function of the library a plurality of times. For example, when the time taken for the device 1000 to access the memory address is shorter than a reference time, it may be determined that the data at the memory address is loaded to the cache memory. The device 1000 may input the input value to the function of the library a plurality of times so as to obtain times taken to access the memory address, and determine whether the data at the memory address is loaded to the cache memory based on the obtained times. Also, the cache-hit rate may be determined based on whether the data at the memory address is loaded to the cache memory.

According to an embodiment, the cache-hit rate with respect to each memory address may have a uniform pattern with respect to an input value. For example, the cache-hit rate with respect to each memory address may have the same value when the same input value is input to the same function of the library.

Referring to the example indicated by the reference numeral 110, when the input value 111, i.e., 4, is input to a function, the cache-hit rates of memory addresses other than the memory address of 0x4980 are close to 0, and the cache-hit rate of the memory address of 0x4980 is close to 1.

An attacker may pre-obtain cache-hit rates of memory addresses corresponding to input values, as indicated by the reference numeral 110. For example, the attacker may pre-obtain the cache-hit rates by sequentially inputting at least one value to a function of a targeted library. Then, when an input value is input to the function of the targeted library, the attacker may calculate a time taken to access each memory address so as to infer the input value by using the pre-obtained cache-hit rates.

For example, the attacker may pre-determine the cache-hit rates as indicated by the reference numeral 110 of FIG. 1, Then, when the input value is input, the attacker may determine that data at the memory address of 0x4980 is loaded to the cache memory since the time taken to access the memory address of 0x4980 is shorter than the reference time. Also, the attacker may determine that data of the remaining memory addresses is not loaded to the cache memory since the times taken to access the remaining memory addresses are longer than the reference time. The attacker may infer that a currently input value is 4 by comparing the cache-hit rate of each memory address with respect to the input value 111, i.e., 4, obtained as the reference numeral 110 with whether the data at each memory address is loaded to the cache memory by the currently input value.

According to an embodiment, the device 1000 may add a protection code also accessing another memory address as an input value is input, such that the attacker is unable to infer the input value through the above method. For example, as shown by a reference numeral 110 of FIG. 1, the device 1000 may add a protection code accessing the memory addresses other than the memory address of 0x4980 to the function to which the input value 111 is input, when the input value 111 of 4 is input to the function.

Accordingly, according to an embodiment, a protection code accessing at least one memory address is added to a function of a library so as to protect an input value from an attacker.

According to an embodiment, the device 1000 may add a protection code to data of a library loaded to a memory. Accordingly, the device 1000 may protect an input value from a side channel attack by adding the protection code to the data loaded to the memory without having to change the data of the library installed in a system.

An attacker according to an embodiment may be one of programs that leaks information of the device 1000, such as an application installed in the device 1000, a malignant code, and ransomware.

In the above embodiment, the input value is input to the function of the library, but according to another embodiment, a value received through any one of various channels may be input to the function of the library. For example, an encryption key value transmitted from another application or an external device may be input to the function of the library, and an attacker may infer the encryption key value according to the method described above. In this regard, a protection code for protecting the input value may be added to the function of the library as described above.

Figure 2:
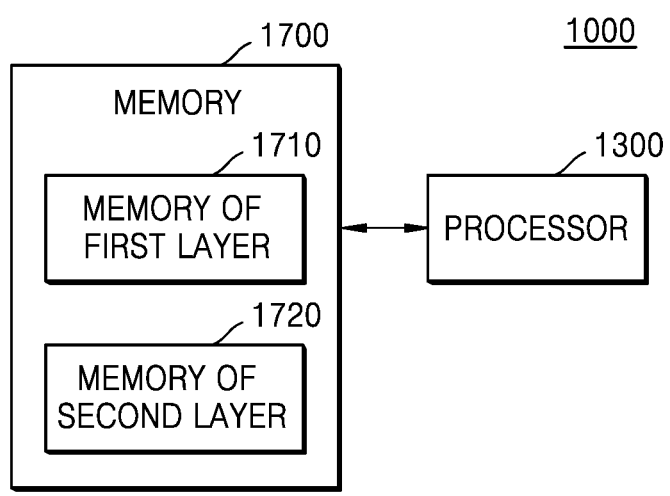
FIGS. 2 and 3 are block diagrams of a device according to embodiments.
Figure 3:
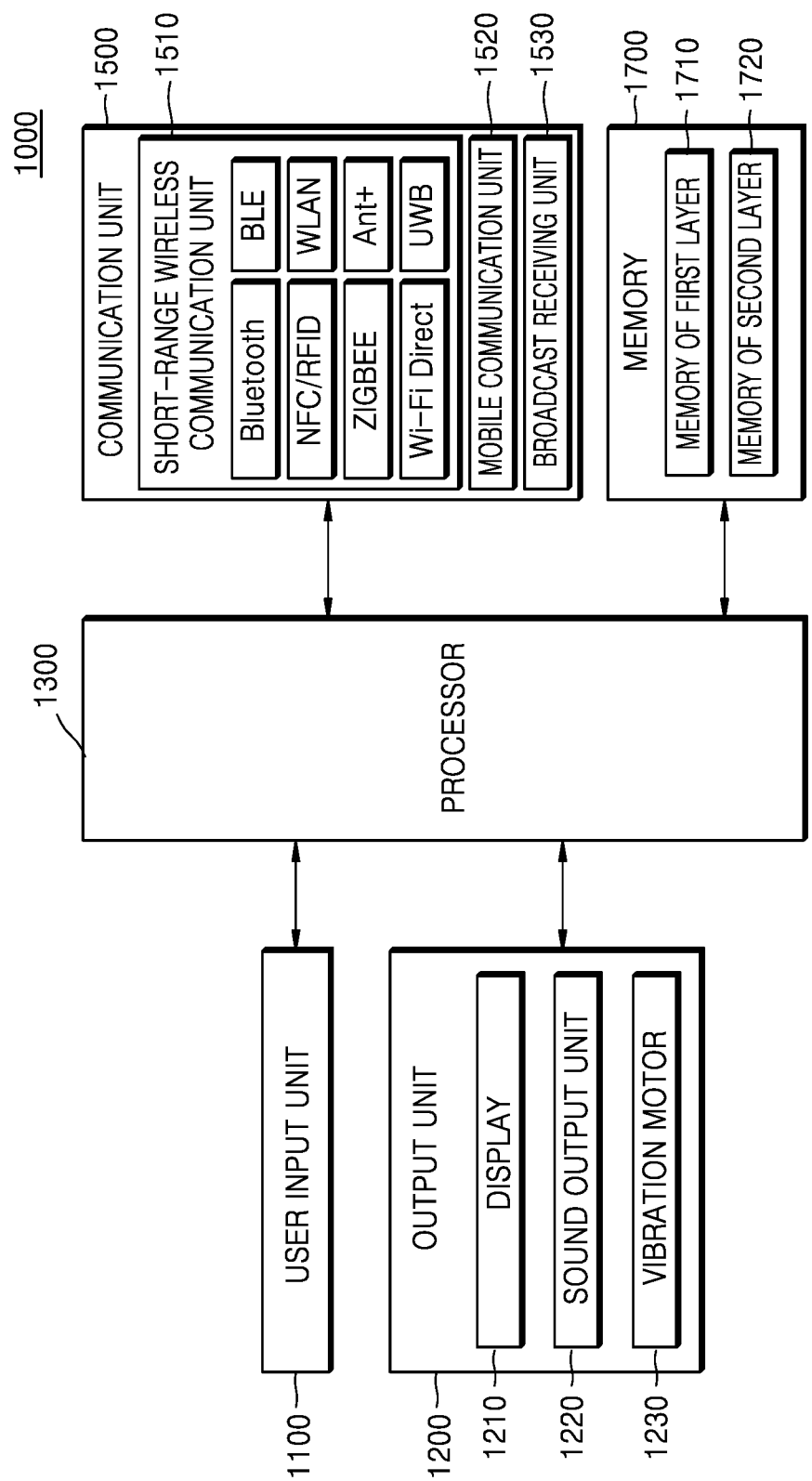

FIGS. 2 and 3 are block diagrams of the device 1000 according to embodiments.

Referring to FIG. 2, the device 1000 may include a memory 1700 and a processor 1300. The memory 1700 may include a memory 1710 of a first layer and a memory 1720 of a second layer. However, the components shown in FIG. 2 are merely one example, and the device 1000 may include more or less components than those shown in FIG. 2.

For example, as shown in FIG. 3, the device 1000 according to an embodiment may further include a user input unit 1100, an output unit 1200, and a communication unit 1500, in addition to the memory 1700 and the processor 1300.

Hereinafter, the above components will now be described.

The user input unit 1100 denotes a unit into which a user inputs data for controlling the device 1000. For example, the user input unit 1100 may include a keypad, a dome switch, a touch pad (a touch capacitance type, a pressure resistance film type, an infrared light detecting type, a surface ultra-sound conducting type, an integral tension measuring type, or a piezo-effect type), a jog wheel, and a jog switch, but are not limited thereto.

The user input unit 1100 may receive an input including important information that requires high security, from the user.

The output unit 1200 may output an audio signal, a video signal, or a vibration signal, and may include a display 1210, a sound output unit 1220, and a vibration motor 1230.

The display 1210 displays information processed by the device 1000. For example, the display 1210 may display a software keyboard. Also, the display 1210 may display a result screen of executing an application according to a user input.

Meanwhile, the display 1210 may be configured as a touch screen by forming a layer structure with a touch pad, the display 1210 may be used as an input device as well as an output device. The display 1210 may include at least one of a liquid crystal display (LCD), a thin-film-transistor liquid-crystal display (TFT-LCD), an organic light-emitting diode (OLED), a flexible display, a 3D display, and an electrophoretic display. Also, according to an embodiment of the device 1000, the device 1000 may include at least two displays 1210.

The sound output unit 1220 outputs audio data received from the communication unit 1500 or stored in the memory 1700.

The vibration motor 1230 may output a vibration signal. Also, the vibration motor 1230 may output a vibration signal when a touch screen is touched.

The processor 1300 controls overall operations of the device 1000. For example, the processor 1300 may execute programs stored in the memory 1700 to control, in general, the user input unit 1100, the output unit 1200, and the communication unit 1500.

In detail, the processor 1300 may load a library shared by at least one application installed in the device 1000 to the memory 1710 of the first layer. Also, the processor 1300 may access at least one region of the memory 1710 to which the library is loaded, by inputting, as an input value, a value to a function of the library. The processor 1300 may generate a protection code accessing regions of the memory 1710 excluding the region accessed by the processor 1300. Also, the processor 1300 may add the protection code to the function of the library.

Also, the processor 1300 may input a plurality of values to the function, and access at least one region of the memory 1710 to which the library is loaded, as the plurality of values are input. The processor 1300 may detect accessed regions as the plurality of values are input. Also, the processor 1300 may determine whether to generate the protection code based on whether the regions detected with respect to the plurality of values are different from each other. According to an embodiment, when the regions accessed by the processor 1300 are the same, a value input to the function is unable to be inferred from among the plurality of values. In this case, the processor 1300 may not generate the protection code.

Also, the processor 1300 may measure a time taken to access the at least one region of the memory 1710 to which the library is loaded, after the input value is input. The processor 1300 may detect the accessed at least one region of the memory 1710 based on the measured time.

The communication unit 1500 may include at least one component enabling the device 1000 to communicate with an external device (not shown). For example, the communication unit 1500 may include a short-range wireless communication unit 1510, a mobile communication unit 1520, and a broadcast receiving unit 1530.

The short-range communication unit 1510 may include a Bluetooth communication unit, a Bluetooth Low Energy (BLE) communication unit, a near-field communication (NFC) unit, a wireless local area network (WLAN) (Wi-Fi) communication unit, a Zigbee communication unit, an Infrared Data Association (IrDA) communication unit, a Wi-Fi direct (WFD) communication unit, an ultra-wideband (UWB) communication unit, and an Ant+ communication unit, but is not limited thereto.

The mobile communication unit 1520 transmits and receives a wireless signal to and from at least one of a base station, an external terminal, and a server, on a mobile communication network. Here, the wireless signal may include data having various formats according to transmission and reception of a voice call signal, a video telephone call signal, or a text/multimedia message.

The broadcast receiving unit 1530 receives a broadcast signal and/or broadcast related information from an external source, through a broadcast channel. The broadcast channel may include a satellite channel or a terrestrial broadcasting channel. According to an embodiment, the device 1000 may not include the broadcast receiving unit 1530.

Also, the communication unit 1500 may exchange encrypted information that may be input to an application, with a server (not shown) and an external device (not shown).

The memory 1700 may store a program for processes and controls of the processor 1300, and may store data input to the device 1000 or output from the device 1000.

The memory 1700 may include at least one type of storage medium from among a flash memory, a hard disk, a multimedia card micro-type memory, a card-type memory (for example, a secure digital (SD) card or an extreme digital (XD) card), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

The memory 1700 may store data and applications for operations of the processor 1300. For example, the memory 1700 may store at least one application installed in the device 1000, and data of a library. Also, the memory 1700 may store ransomware, spyware, a malignant application, or a malignant code that operates as the attacker described above.

The memory 1700 may include the memory 1710 of the first layer and the memory 1720 of the second layer. Also, the memory 1700 is not limited to those shown in FIGS. 2 and 3, and may include memories of a plurality of layers.

The memory 1710 of the first layer may be a memory of a layer lower than the memory 1720 of the second layer. For example, the memory 1710 of the first layer may be a main memory, and the memory 1720 of the second layer may include at least one of a cache memory and a register. Here, a memory of an upper layer may be accessed faster than a memory of a lower layer.

The memory 1710 of the first layer may load a library shared by at least one application installed in the device 1000. When a function is invoked according to an operation of an application, a library including the invoked function may be loaded to the memory 1710 of the first layer. For example, data of the library may be stored in a memory of a layer lower than the memory 1710 of the first layer, such as a hard disk, and loaded to the memory 1710 of the first layer according to invocation of the application.

When a region of the memory 1710 of the first layer is accessed by the processor 1300, the memory 1720 of the second layer may load data of the accessed region of the memory 1710 of the first layer. The memory 1720 of the second layer may be a memory of an upper layer than the memory 1710 of the first layer.

Figure 4:
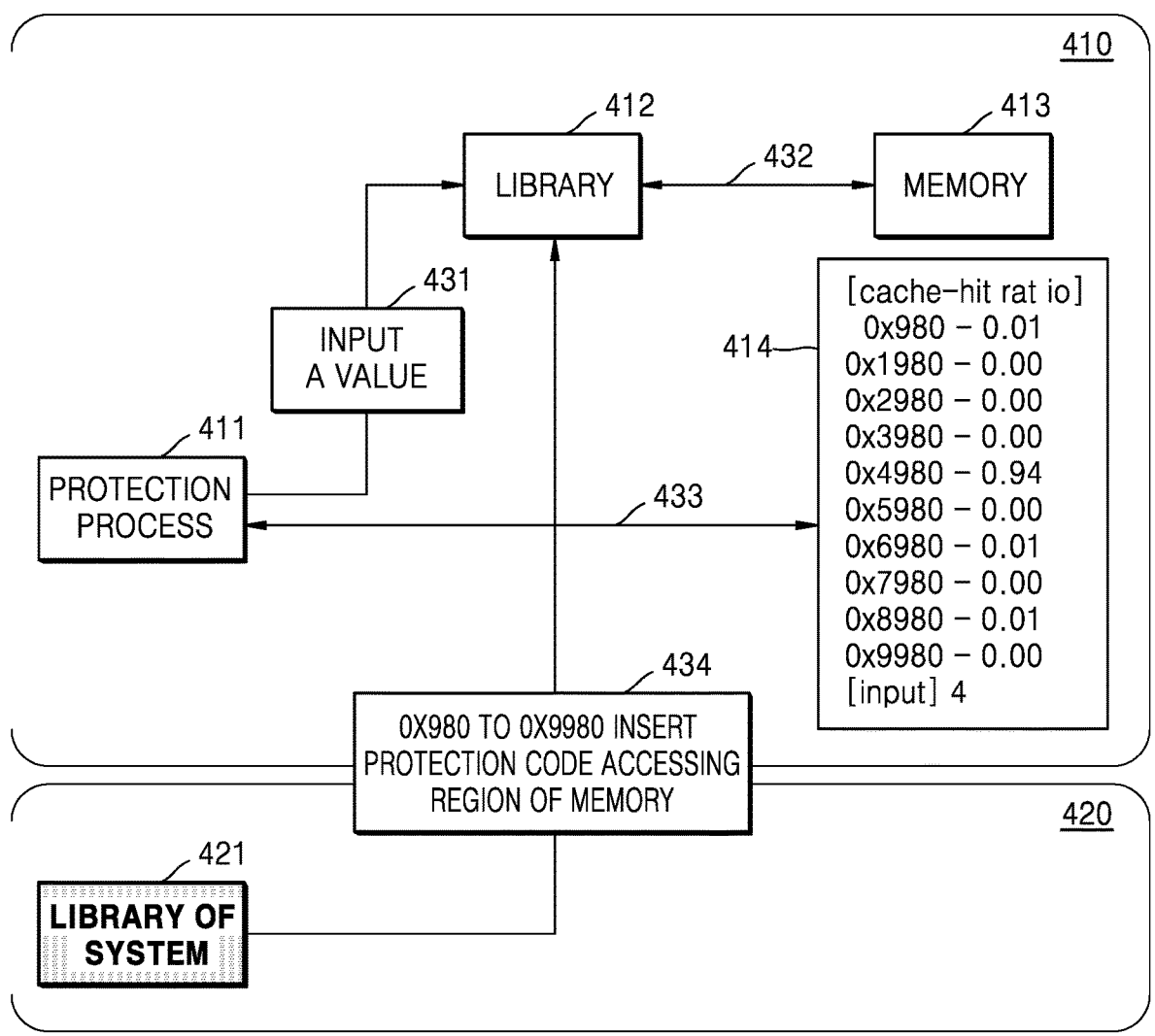
FIG. 4 is a diagram illustrating an example of a method of adding a protection code for protecting a value input to a library, according to an embodiment.

FIG. 4 is a diagram illustrating an example of a method of adding a protection code for protecting a value input to a library, according to an embodiment.

Referring to FIG. 4, a reference numeral 410 denotes a region of a memory to which a library is loaded in the device 1000, and a reference numeral 420 denotes a region of a system where the library is stored in the device 1000. Also, operations 431 through 434 indicate a method of protecting a value input to the library, according to an embodiment.

A protection process 411 according to an embodiment may be a program installed in the device 1000 to perform a method of protecting a value input to a library.

The protection process 411 may determine a library 412 and a function of the library 412 to which a protection code is to be added.

A library that satisfies a pre-determined condition, for example, a user input library or a crypto library, may be determined to be the library 412 to which the protection code is to be added.

In the protection process 411, the protection code may be generated and added to the library 412 as described with reference to FIG. 4. According to an embodiment, in the protection process 411, the protection code may be added to at least one function included in the library 412.

According to an embodiment, the protection process 411 may load a library 421 of a system to the region of the memory so as to generate the protection code. Alternatively, when the system of the device 1000 is booted to start an operating system, the library 421 of the system may be loaded to the region of the memory. According to an embodiment, the library 421 may be stored in a region of a hard disk before being loaded to the region of the memory. However, an embodiment is not limited thereto, and the library 421 may be loaded to the region of the memory via any one of various methods.

In operation 431, in the protection process 411 of the device 1000, when the library 421 is loaded to the region of the memory, a value may be input to one of functions included in the library 412 loaded to the region of the memory. The value may be determined from among at least one value which may be input to a function. According to an embodiment, in the protection process 411, at least one value which may be input to each function may be input to at least one function included in the library 421.

According to an embodiment, the protection process 411 may determine a function into which the value is to be input in operation 431, so as to generate the protection code. For example, in the protection process 411, a function that receives, as an input value, a user's input value or an encryption key value may be determined as the function into which the value is to be input in operation 431. However, an embodiment is not limited thereto, and the protection process 411 may determine at least one of the functions included in the library 412 as the function into which the value is to be input, via any one of various methods.

In operation 432, based on the value being input to the function in the protection process 411, the device 1000 may access a region of a memory 413 in which the library 412 is stored. According to an embodiment, the device 1000 may access the region of the memory 413 where the library 412 is stored so as to process the value input to the function of the library 421, and obtain data. According to an embodiment, the data of the region of the memory 413 accessed by the device 1000 may be loaded to a cache memory, i.e., a memory of an upper layer, such that the device 1000 performs a quick operation.

In operation 433, in the protection process 411, a cache-hit rate indicating a probability of data at each memory address being loaded to the cache memory according to the input value, may be obtained based on the region of the memory 413 accessed by the device 1000 according to the input value in operation 432, may be obtained. According to an embodiment, in the protection process 411, whether to add the protection code to the function of the library 412 may be determined based on the cache-hit rate of each memory address with respect to the input value.

For example, in the protection process 411, whether to add the protection code to the function of the library 412 may be determined based on whether cache-hit rates of a plurality of memory addresses are different according to each input value. When the cache-hit rates of the plurality of memory addresses are the same according to each input value, it is difficult for an attacker to infer which one of a plurality of values is input to the function based on whether each region of memory address is loaded to the cache memory. In the protection process 411, the protection code may not be generated with respect to the function when it is difficult for the attacker to infer the input value.

As another example, in the protection process 411, it may be determined whether to add the protection code to the function of the library 412 based on whether patterns of the cache-hit rates of the plurality of memory addresses according to input values are distinguishable according to input values. The pattern of the cache-hit rates of the memory addresses may denote cache-hit rates of memory addresses distinguishable according to input values. When the pattern of the cache-hit rates of the plurality of regions of memory addresses according to input values are the same, it is difficult for the attacker to infer the input value input to the function based on whether each region of memory address is loaded to the cache memory. In the protection process 411, the protection code may not be generated with respect to the function when it is difficult for the attacker to infer the input value.

In operation 434, in the protection process 411, the protection code may be added to the function based on whether the cache-hit rates or the patterns of the cache-hit rates of the plurality of memory addresses are different according to input values.

The protection code according to an embodiment may include a code for accessing a region of a memory other than a region accessed as a value is input. The protection code may include a code for accessing all or a part of a memory address to which data of a library of a function is loaded when the value is input.

For example, as indicated by a reference numeral 434, the protection code may include a code also accessing memory addresses of 0x980 to 0x9980 in addition to a memory address of 0x4980 when 4 is input to the function.

The protection code according to an embodiment may be pre-generated when the device 1000 is being booted or is in an idle state. The device 1000 may pre-generate the protection code. When a library is loaded to a region of a memory later, the device 1000 may add the pre-generated protection code to a corresponding function of a library. Since a memory address may change whenever the library is loaded to the region of the memory, the device 1000 may change the pre-generated protection code and add the changed protection code to the corresponding function of the library based on the changed memory address.

Also, the protection code according to an embodiment may include a location where a code for accessing regions of a memory other than a region of the memory accessed as a value is input is stored. The device 1000 may identify the code for accessing the regions of the memory other than the region of the memory accessed as the value is input, and generate the protection code including the location where the identified code is stored.

Figure 5:
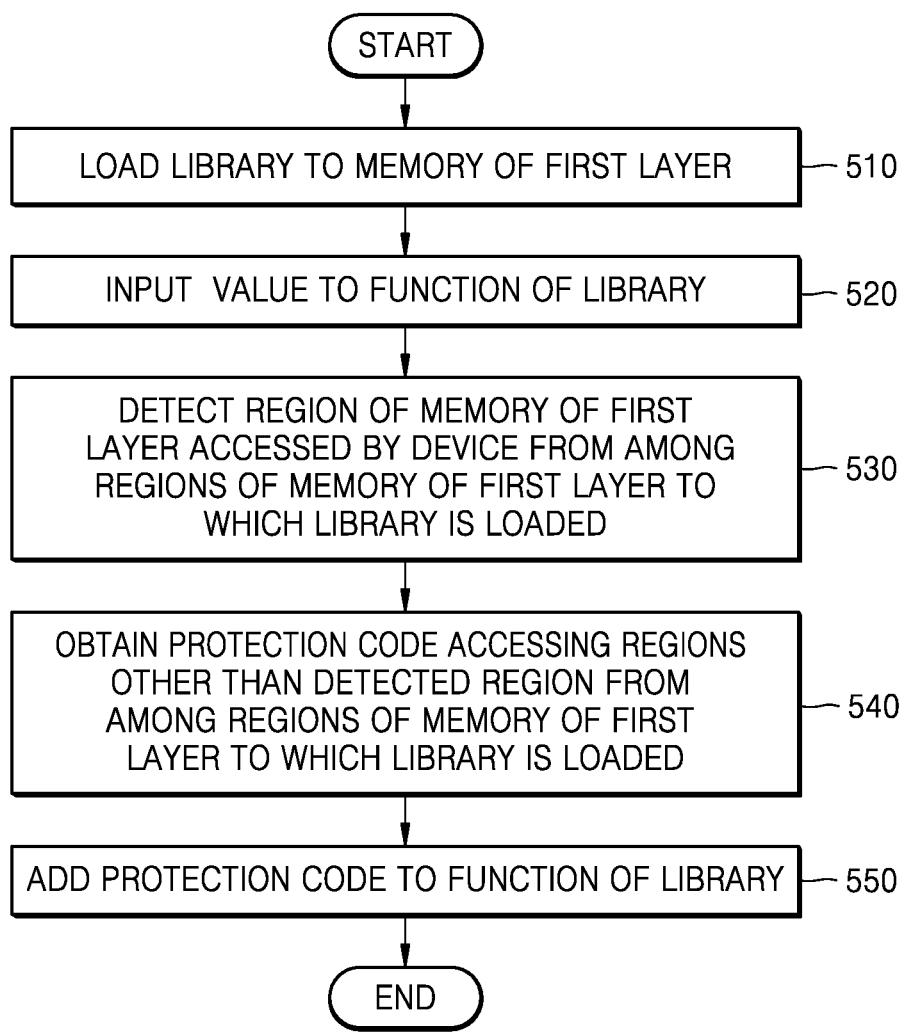
FIG. 5 is a flowchart of a method of inserting a protection code for protecting a value input to a library, according to an embodiment.

FIG. 5 is a flowchart of a method of inserting a protection code for protecting a value input to a library, according to an embodiment.

In operation 510, the device 1000 may load a library shared by at least one application installed in the device 1000 to a memory of a first layer. According to an embodiment, in order to generate a protection code, the device 1000 may load the library to be protected to the memory of the first layer. Alternatively, the device 1000 may generate a protection code according to an embodiment when the device 1000 detects that the library to be protected is loaded to the memory of the first layer via generation of various events. When the library to be protected is loaded to the memory of the first layer, the device 1000 may generate the protection code with respect to the library and insert the protection code to the library.

In operation 520, the device 1000 may input a value, as an input value, to a function of the library. The value may include at least one of the values which may be input to the function. The function of the library may include at least one function included in the library. According to an embodiment, the device 1000 may determine the library and the function to which a protection code is to be added, according to a pre-set condition.

In operation 530, the device 1000 may detect a region of the memory of the first layer accessed by the device 1000, from among regions of the memory of the first layer to which the library is loaded, as the value is input. According to an embodiment, the device 1000 may measure a time taken to access the region of the memory after the value is input. The device 1000 may detect, as the region accessed by the device 1000, a region accessed in a shorter measured time than a reference value.

In operation 540, the device 1000 may generate a protection code accessing regions other than the detected region from among the regions of the memory of the first layer to which the library is loaded. The device 1000 may generate the protection code such that the value input to the function of the library is not inferred by an attacker who determines whether each memory address is accessed. The protection code prevents the attacker from inferring the value by performing a process of accessing a region other than the detected region when the value is input to the function.

In operation 550, the device 1000 may add the protection code to the function of the library. In operation 550, the device 1000 may add the protection code with respect to data of the library loaded to the memory of the first layer. Accordingly, the device 1000 may defend against a side channel attack of the attacker by adding the protection code to the data of the library loaded to the memory without having to change data of a library installed in a system.

Also, according to an embodiment, since the protection code may be added to the data of the library loaded to the memory without having to change the data of the library installed in the system, performance deterioration caused by changing the data of the library installed in the system may be prevented.

Also, according to an embodiment, the device 1000 may add the protection code generated in operation 540 to the function whenever the library is loaded to the memory of the first layer.

Figure 6:
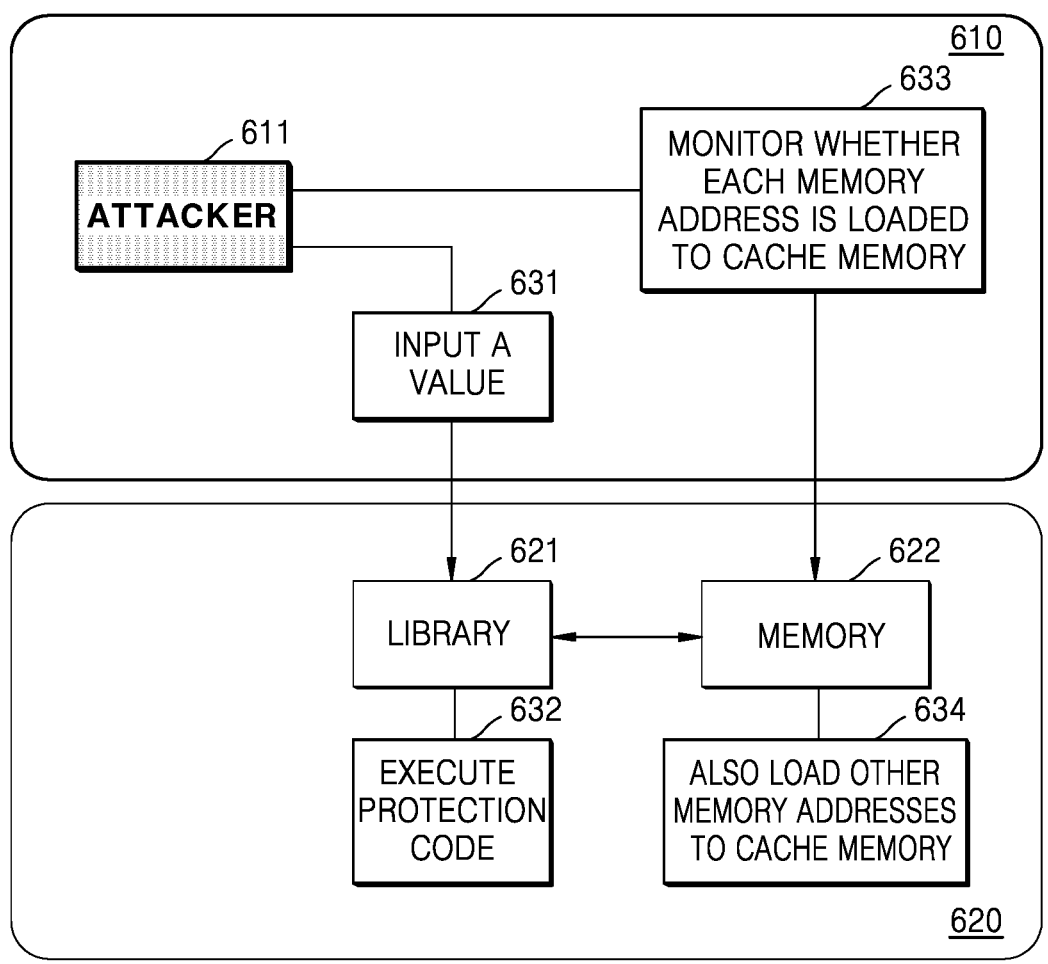
FIG. 6 is a diagram for describing how a protection code protects, from an attacker, a value input to a library according to an embodiment.

FIG. 6 is a diagram for describing how a protection code protects, from an attacker 611, a value input to a library, according to an embodiment.

In FIG. 6, a reference numeral 610 denotes an attacking process of the attacker 611 and a reference numeral 620 denotes a process of protecting, by a protection code, an input value with respect to a library 621. Also, operations 631 through 634 denote a method of protecting a value input to the library 621 from the attacker 611, according to an embodiment.

In operation 631, the attacker 611 may input a value to a function of the library 621 so as to obtain information about an accessed region of a memory 622 corresponding to each input value.

In operation 632, a protection code included in the function may be executed when the attacker 611 inputs the value to the function of the library 621. The protection code may be added to the function of the library 621 loaded to a memory of a first layer during the protection process 411 of FIG. 4, before operation 631 is performed. When the protection code is executed, regions of the memory 622 other than a region of the memory 622 accessed as the value is input may also be accessed.

In operation 633, the attacker 611 may monitor whether each memory address is loaded to a cache memory so as to obtain the information about the accessed region of the memory 622. The attacker 611 may determine whether data at each memory address is loaded to the cache memory by measuring a time taken to access each memory address of the library 621.

In operation 634, in response to the execution of the protection code in operation 632, regions of the memory 622 other than the accessed region may also be loaded to the cache memory as the other regions of the memory 622 are also accessed. Accordingly, the attacker 611 is unable to distinguish whether each memory address is loaded to the cache memory based on an input value. Accordingly, it may be difficult for the attacker 611 to match input values to regions of the memory 622 loaded to the cache memory.

According to an embodiment, when the value is input, not only the region of the memory 622 accessed by the value, but also the other regions of the memory 622 are accessed by the protection code. Accordingly, even when the attacker 611 monitors access to each region of the memory 622 with respect to the value, i.e., loading to the cache memory, the attacker 611 is unable to determine a pattern of accessing a region of the memory 622 corresponding to the value.

According to an embodiment, an input value with respect to a library may be protected from a side channel attack in which the input value is inferred by determining access to a memory.

According to an embodiment, a side channel attack, in which a value input to a library is determined by measuring a time taken to access a memory address, may be prevented.

An embodiment of the present disclosure may also be realized in a form of a computer-readable recording medium, such as a program module executed by a computer. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. The communication medium typically include a computer-readable instruction, a data structure, a program module, other data of a modulated data signal, or another transmission mechanism, and an example thereof includes an arbitrary information transmission medium.

Also, in the present specification, a "unit" may be a hardware component, such as a processor or a circuit, and/or a software component executed by the hardware component, such as a processor.

While the present disclosure has been particularly shown and described with reference to embodiments thereof, it will be understood by those of ordinary skill in the art that various changes in form and details may be made therein without departing from the spirit and scope of the present disclosure as defined by the following claims. Hence, it will be understood that the embodiments described above are not limiting the scope of the disclosure. For example, each component described in a single type may be executed in a distributed manner, and components described distributed may also be executed in an integrated form.

While embodiments have been described with reference to the figures, it will be understood by those of ordinary skill in the art that various changes in form and details may be made therein without departing from the spirit and scope as defined by the following claims.

What is claimed is:

1. A method, performed by a device, of protecting information from a side channel attack, the method comprising:
    loading a library shared by at least one application installed in the device to a memory of a first layer;
    inputting a value to a function of the library;
    based on the value being input, detecting a region of the memory accessed by the device from among regions of the memory of the first layer, to which the library is loaded;
    generating a protection code which accesses, when the detected region is accessed in response to inputting the value to the function of the library, at least one region of the memory of the first layer other than the detected region from among the regions of the memory of the first layer, to which the library is loaded; and
    adding the protection code to the function of the library.

2. The method of claim 1, wherein the generating of the protection code comprises:
    inputting a plurality of values into the function;

based on the plurality of values being input, detecting regions of the memory accessed by the device from among the regions of the memory of the first layer, to which the library is loaded, respectively with respect to the plurality of values; and determining whether to generate the protection code based on whether the regions respectively detected with respect to the plurality of values are different from each other.

3. The method of claim 1, wherein the generating of the protection code comprises determining the at least one s-region of the memory of the first layer, which is to be accessed by the protection code, based on the detected region.

4. The method of claim 1, wherein the detecting of the region comprises:

measuring a time taken to access the region of the memory from among the regions of the memory of the first layer, to which the library is loaded, after the value is input; and detecting the region of the memory accessed by the device, based on the time that is measured.

5. The method of claim 1, wherein, based on the region of the memory of the first layer being accessed by the function of the library, data of the accessed region of the memory of the first layer is loaded to a memory of a second layer.

6. The method of claim 5, wherein the memory of the first layer is a memory of a layer that is lower than the memory of the second layer.

7. The method of claim 5, wherein the memory of the first layer is a main memory, and the memory of the second layer is a cache memory or a register.

8. A device comprising:

a memory of a first layer configured to load a library shared by at least one application installed in the device; and a processor configured to:

input a value to a function of the library, based on the value being input, detect a region of the memory from among regions of the memory of the first layer, to which the library is loaded, generate a protection code which accesses, when the detected region is accessed in response to inputting the value to the function of the library, at least one region of the memory of the first layer other than the accessed region from among the regions of the memory of the first layer, to which the library is loaded, and add the protection code to the function of the library.

9. The device of claim 8, wherein the processor is further configured to:

input a plurality of values into the function, based on the plurality of values being input, detect regions of the memory accessed by the processor from among the regions of the memory of the first layer, to which the library is loaded, respectively with respect to the plurality of values, and determine whether to generate the protection code based on whether the regions respectively detected with respect to the plurality of values are different from each other.

10. The device of claim 8, wherein the processor is further configured to determine the at least one region of the memory of the first layer, which is to be accessed by the protection code, based on the region accessed by the processor.

11. The device of claim 8, wherein the processor is further configured to:

measure a time taken to access the region of the memory from among the regions of the memory of the first layer, to which the library is loaded, after the value is input, and detect the region of the memory accessed by the processor device based on the measured time.

12. The device of claim 8, further comprising a memory of a second layer, wherein, based on the at least one region of the memory of the first layer being accessed by the function of the library, data of the accessed region of the memory of the first layer is loaded to the memory of the second layer.

13. The device of claim 12, wherein the memory of the first layer is a memory of a layer lower than the memory of the second layer.

14. The device of claim 12, wherein the memory of the first layer is a main memory of the device, and the memory of the second layer is a cache memory or a register of the device.

15. A non-transitory computer-readable recording medium having recorded thereon a program which, when executed by a computer, performs the method of claim 1.

* * * * *